United States Patent
Park

(10) Patent No.: US 12,001,361 B2
(45) Date of Patent: Jun. 4, 2024

(54) APPARATUS AND METHOD FOR DATA COMMUNICATIONS BETWEEN NON-VOLATILE MEMORY DEVICES AND A MEMORY CONTROLLER

(71) Applicant: SK hynix Inc., Icheon-si (KR)

(72) Inventor: Kyu Tae Park, Icheon-si (KR)

(73) Assignee: SK HYNIX INC., Icheon-si (KR)

(*) Notice: Subject to any disclaimer, the term of this patent is extended or adjusted under 35 U.S.C. 154(b) by 104 days.

(21) Appl. No.: 17/497,472

(22) Filed: Oct. 8, 2021

(65) Prior Publication Data

US 2022/0350762 A1 Nov. 3, 2022

(30) Foreign Application Priority Data

Apr. 30, 2021 (KR) .................. 10-2021-0056338

(51) Int. Cl.
*G06F 13/24* (2006.01)
*G06F 13/16* (2006.01)
*G06F 13/40* (2006.01)

(52) U.S. Cl.
CPC .......... *G06F 13/24* (2013.01); *G06F 13/1673* (2013.01); *G06F 13/1689* (2013.01); *G06F 13/4072* (2013.01)

(58) Field of Classification Search
CPC .. G06F 13/24; G06F 13/1673; G06F 13/1689; G06F 13/4072
See application file for complete search history.

(56) References Cited

U.S. PATENT DOCUMENTS

| | | | | |
|---|---|---|---|---|
| 5,740,174 A | * | 4/1998 | Somer ................... | H04L 12/413 370/402 |
| 6,366,686 B1 | * | 4/2002 | Schroeder ............... | G06T 1/20 382/141 |
| 7,478,186 B1 | * | 1/2009 | Onufryk ................. | G06F 13/24 710/263 |
| 2002/0085418 A1 | * | 7/2002 | Goto ....................... | G11C 8/12 365/185.11 |
| 2015/0074305 A1 | * | 3/2015 | Sengoku ................. | G06F 13/36 710/110 |
| 2015/0254198 A1 | * | 9/2015 | Anderson ............... | G06F 13/364 710/110 |

FOREIGN PATENT DOCUMENTS

KR 100898544 B1 5/2009
KR 101743048 B1 6/2017

\* cited by examiner

*Primary Examiner* — Phong H Dang
(74) *Attorney, Agent, or Firm* — Perkins Coie LLP

(57) ABSTRACT

A data communication apparatus includes a transceiver coupled to a data path and configured to transmit or receive data through the data path; and an interrupt circuit coupled to an interrupt path corresponding to the data path and configured to determine whether to allow any apparatus to occupy the data path. The interrupt circuit generates an interrupt signal for preventing another apparatus from accessing the data path, in response to an activation signal for transmitting or receiving the data through the transceiver.

19 Claims, 11 Drawing Sheets

APPARATUS AND METHOD FOR DATA COMMUNICATIONS BETWEEN NON-VOLATILE MEMORY DEVICES AND A MEMORY CONTROLLER

CROSS-REFERENCE TO RELATED APPLICATIONS

This patent document claims the priority and benefits of Korean Patent Application No. 10-2021-0056338, filed on Apr. 30, 2021, the entire disclosure of which is incorporated herein by reference.

TECHNICAL FIELD

The embodiments of the disclosed technology relate to a memory system.

BACKGROUND

Recently, the computing environment paradigm is transitioning to ubiquitous computing, enabling computing to appear anytime and anywhere. The recent increase in the use of ubiquitous computing is leading to an increase in the use of portable electronic devices (e.g., mobile phones, digital cameras, notebook computers, or others). Such portable electronic devices may use or include a memory system having at least one memory device as its data storage medium. The memory system may be a data storage device, which can be used as a main storage device or an auxiliary storage device of a portable electronic device.

Such a semiconductor-based data storage device provides advantages over the traditional hard disk drives since semiconductor memory devices have no mechanical moving parts (e.g., a mechanical arm), and thus offers excellent stability and durability, high data rate and low power consumption. Examples of the semiconductor-based data storage device include Universal Serial Bus (USB) memory devices, memory cards having various interfaces, and solid state drives (SSDs).

SUMMARY

The technology disclosed in this patent document can be implemented in various embodiments.

One example of such embodiments is an implementation of a data communication apparatus which includes a transceiver coupled to a data path and configured to transmit or receive data through the data path, and an interrupt circuit coupled to an interrupt path corresponding to the data path and configured to determine whether to allow any apparatus to occupy the data path, wherein the interrupt circuit generates an interrupt signal for preventing another apparatus from accessing the data path in response to an activation signal for transmitting or receiving the data through the transceiver.

Another example of the embodiments of the disclosed technology is an implementation of a system which includes a data path shared by a plurality of transceivers and structured to carry data transferred from one transceiver to another transceiver of the plurality of transceivers, and an interrupt path shared by a plurality of interrupt circuits and structured to carry an interrupt signal for interrupting access to the data path corresponding to the interrupt path, wherein a first interrupt circuit of the plurality of interrupt circuits generates an interrupt signal that is transmitted through the interrupt path to interrupt access by the plurality of transceivers before a first transceiver corresponding to the first interrupt circuit transmits data via the data path.

Another example of the embodiments of the disclosed technology is an implementation of a data communication method which includes receiving an activation signal for transmit or receive data through a first device of a plurality of devices via a data path shared by the plurality of devices, generating a first interrupt signal for interrupting access by the plurality of devices based on the activation signal, activating a control signal to be applied to the first device based on the first interrupt signal and the activation signal, and transmitting or receiving the data through the first device based on the control signal.

Another example of the embodiments of the disclosed technology is an implementation of a data communication apparatus which includes a transceiver coupled to a data path and configured to transmit or receive data, and an interrupt circuit coupled to an interrupt path corresponding to the data path and configured to determine whether another apparatus uses or occupies the data path, wherein the interrupt circuit is configured to receive an activation signal for transmitting or receiving the data and generate an interrupt signal for preventing the other apparatus from using or occupying the data path.

Another example of the embodiments of the disclosed technology is an implementation of a system which includes a data path transferring data, a plurality of transceivers sharing the data path, an interrupt path transferring an interrupt signal, the interrupt path corresponding to the data path, and a plurality of interrupt circuits sharing the interrupt path, wherein a first interrupt circuit of the plural interrupt circuits generates an interrupt signal, which causes another transceiver of the plural transceivers to stop using the data path, to the interrupt path, based on a first signal activating a first transceiver of the plural transceivers, the first transceiver corresponding to the first interrupt circuit.

Yet another example of the embodiments of the disclosed technology is an implementation of a method for performing data communication in a first device of the plural devices. This method includes receiving an activation signal for transmitting or receiving data via a data path shared by the plural devices, generating a first interrupt signal based on the activation signal, activating a control signal applied to a transceiver based on the first interrupt signal and the activation signal, and transmitting or receiving the data through the transceiver based on the control signal.

Those and other implementations and embodiments are described in greater detail in the drawings, the description and the claims of this patent document.

DETAILED DESCRIPTION

Figure 1:
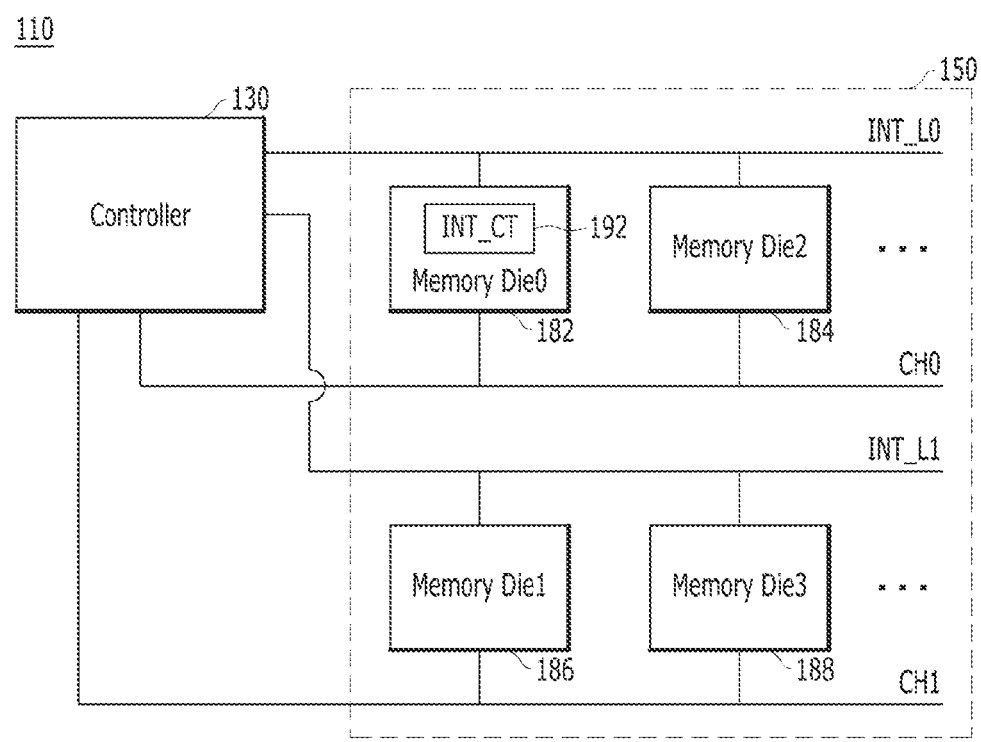
FIG. 1 illustrates an example of a memory system based on some embodiments of the disclosed technology.

Various embodiments of the disclosure are described below with reference to the accompanying drawings. Elements and features of the disclosure, however, may be configured or arranged differently to form other embodiments, which may be variations of one or more of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that one or more such features may be selectively included or implemented in one or more embodiments.

In this patent document, the terms "comprise," "comprising," "include," and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this patent document, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. In this patent document, "circuitry" or "logic" can include the following: (a) electric circuits such as analog and/or digital circuits and (b) combinations of electric circuits and software (e.g., firmware) that are applicable to: (i) a processor or a combination of processors; (ii) portions of processor/software such as digital signal processors, software and memory devices that work together to cause an electrical apparatus, such as a mobile phone or a server system, to perform various functions; and (c) electric circuits, such as a microprocessor or a portion of a microprocessor that requires software or firmware for operation The "circuitry" or "logic" can also include a processor or multiple processors or a portion of a processor and associated software and/or firmware. The "circuitry" or "logic" can also include an integrated circuit for a data storage device.

As used herein, these terms "first," "second," "third," and so on are used as labels for nouns that they precede, and may not imply any type of ordering (e.g., spatial, temporal, logical, etc.). The terms "first" and "second" may not necessarily imply that the first value must be written before the second value. Further, although the terms may be used herein to identify various elements, these elements are not limited by these terms. These terms may be used to distinguish one element from another element that otherwise have the same or similar names. For example, a first circuitry may be distinguished from a second circuitry in some aspect in certain implementations.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

In this patent document, "data" may include a sequence of bits. For example, the "data" may include the contents of a file, a portion of the file, a page in a memory, an object in an object-oriented program, a digital message, a digital scanned image, a part of a video or audio signal, metadata or any other information that can be represented by a sequence of bits. In some implementations, the data may include a discrete object. In some implementations, the data may include a unit of information within a transmission packet that is transmitted between two different components.

The disclosed technology can be implemented in some embodiments to provide a data communication apparatus, a memory system, and a method for improving data input/output operations of a memory system.

In some embodiments of the disclosed technology, a memory system can include a plurality of memory devices and a controller that is in communication with the plurality of memory devices via at least one data path (e.g., a channel, a bus, etc.). The memory system can perform data input/output operations or data transfer operations between the controller and the plurality of memory devices. Even when the plurality of memory devices shares a data path to communicate with the controller, each of the memory devices can access the data path without contention during the data input/output operations or the data transfer operations.

In some implementations, when one of the memory devices generates an interrupt signal in response to an enable signal for data input/output operations during the communication between the controller and the plurality of memory devices in the memory system implemented based on some embodiments of the disclosed technology, the other memory devices can disable their transceivers associated with the data path. That is, when one device among a plurality of devices sharing a data path generates an interrupt signal, the remaining devices sharing the data path hold off their data transmissions in response to the interrupt signal.

In preventing the plurality of memory devices that shares the data path from transmitting/receiving data when an interrupt signal is activated, the memory system implemented based on some embodiments of the disclosed technology might not have to perform transmission of signals which is generated to comply with data communication protocols associated with the memory devices and the controller. The signal transmissions of the memory system implemented based on some embodiments of the disclosed technology do not require the controller to check as to which of the memory devices currently occupies the data path for communication. The plurality of memory devices in the memory system may determine whether they are allowed to occupy the data path based on an existence of an interrupt signal or other information associated with an interrupt circuit.

In an embodiment, a data communication apparatus can include a transceiver and an interrupt circuit. The transceiver is coupled to a data path and configured to transmit or receive data, and the interrupt circuit is coupled to an interrupt path corresponding to the data path and configured to determine whether to allow any apparatus to occupy the data path. The interrupt circuit can generate an interrupt signal for preventing another apparatus from accessing the data path in response to an activation signal for transmitting or receiving the data through the transceiver.

The interrupt circuit can be further configured to deactivate the transceiver upon receipt of the interrupt signal via the interrupt path.

The data communication apparatus can further include a memory group coupled to the data path. In one example, the memory group includes a plurality of volatile memory cells or a plurality of non-volatile memory cells structured to store the data.

The interrupt circuit can generate a control signal for activating the transceiver, after generating the interrupt signal in response to the activation signal.

The transceiver can include a tri-state buffer configured to transmit or receive the data based on the control signal.

The data path and the interrupt path can be shared by a plurality of devices including the data communication apparatus and the other apparatus. The other interrupt signal can be generated by any device of the plurality of devices.

In an embodiment, a system can include a data path shared by a plurality of transceivers and structured to carry data transferred from one transceiver to another transceiver of the plurality of transceivers. In some implementations, the system may also include a plurality of transceivers sharing the data path. The system may include an interrupt path shared by a plurality of interrupt circuits and structured to carry an interrupt signal for interrupting access to the data path corresponding to the interrupt path. In some implementations, the system may also include a plurality of interrupt circuits sharing the interrupt path. A first interrupt circuit of the plurality of interrupt circuits generates an interrupt signal that is transmitted through the interrupt path to interrupt access by the plurality of transceivers before a first transceiver corresponding to the first interrupt circuit transmits data via the data path.

The system can include a plurality of memory chips. Each memory chip can include at least one of an array of volatile memory cells or an array of non-volatile memory cells. The system can also include a controller configured to control a data input/output operation performed in the plurality of memory chips. Each of the plurality of memory chips can include one of the plurality of transceivers and one of the plurality of interrupt circuits. The data path can include at least one channel structured to couple the controller to the plurality of memory chips.

The first interrupt circuit can be configured to deactivate the first transceiver upon receipt of the interrupt signal via the interrupt path.

The first interrupt circuit can generate a control signal for activating the first transceiver, after generating the interrupt signal in response to a first signal input to the first transceiver for transmitting the data.

The first transceiver can include a tri-state buffer configured to transmit or receiver the data based on the control signal provided by the interrupt circuit.

The interrupt path can include a first line for transferring the interrupt signal, and the first line is coupled to a switching circuit configured to activate or deactivate the first line in response to a set-up signal provided by the plural interrupt circuits.

The switching circuit can include plural transistors serially connected between a power supply terminal for providing voltages and the first line.

The first interrupt circuit can include a first component configured to generate a set-up signal activating the interrupt path in response to the first signal, a second component configured to generate a control signal for activating the first transceiver in response to the first signal, a third component configured to deactivate the control signal upon activating the interrupt path, and a fourth component configured to reset the control signal based on a status reset signal.

The first component can include a delay unit configured to delay the first signal by a preset time.

In another embodiment, a data communication method can include receiving an activation signal for transmit or receive data through a first device of a plurality of devices via a data path shared by the plurality of devices, generating a first interrupt signal for interrupting access by the plurality of devices based on the activation signal, activating a control signal to be applied to the first device based on the first interrupt signal and the activation signal, and transmitting or receiving the data through the first device based on the control signal.

The method can further include maintaining a first status for deactivating the control signal while the activation signal is not input, and deactivating the control signal based on the first status and a second interrupt signal.

The second interrupt signal can be output by a second device of the plurality of devices different from the first device.

The method can further include deactivating the control signal upon deactivating the activation signal.

The method can further include applying a status reset signal upon deactivating the control signal.

In some embodiments of the disclosed technology, a data communication apparatus includes a transceiver coupled to a data path and configured to transmit or receive data, and an interrupt circuit coupled to an interrupt path corresponding to the data path and configured to determine whether another apparatus uses or occupies the data path, wherein the interrupt circuit is configured to receive an activation signal for transmitting or receiving the data and generate an interrupt signal for preventing the other apparatus from using or occupying the data path.

In some embodiments of the disclosed technology, a system includes a data path transferring data, a plurality of transceivers sharing the data path, an interrupt path transferring an interrupt signal, the interrupt path corresponding to the data path, and a plurality of interrupt circuits sharing the interrupt path, wherein a first interrupt circuit of the plural interrupt circuits generates an interrupt signal, which causes another transceiver of the plural transceivers to stop using the data path, to the interrupt path, based on a first signal activating a first transceiver of the plural transceivers, the first transceiver corresponding to the first interrupt circuit.

In some embodiments of the disclosed technology, a method for performing data communication in a first device of the plural devices includes receiving an activation signal for transmitting or receiving data via a data path shared by the plural devices, generating a first interrupt signal based on the activation signal, activating a control signal applied to a transceiver based on the first interrupt signal and the activation signal, and transmitting or receiving the data through the transceiver based on the control signal.

Some embodiments of the disclosed technology are described with reference to the accompanying drawings below.

FIG. 1 illustrates an example of a memory system based on some embodiments of the disclosed technology. Specifically, in FIG. 1, the memory system 110 based on some embodiments of the disclosed technology can include a plurality of memory chips 182, 184, 186, 188.

Referring to FIG. 1, the memory system 110 can include a memory controller 130 and a memory device 150. The memory device 150 can include a plurality of memory chips 182, 184, 186, 188 that store data. The plurality of memory chips 182, 184, 186, 188 can share data channels CH0, CH1 for providing communications. For example, a first memory chip 182 and a second memory chip 184 can be coupled to the controller 130 via a first data channel CH0. The first data channel CH0 may carry data between the controller 130 and the first and second memory chips 182, 184, and the first data channel CH0 is shared by the first memory chip 182 and the second memory chip 184. In some embodiments of the disclosed technology, other memory chips not shown in FIG. 1 can also be coupled to the controller 130 through the first data channel CH0.

In some embodiments of the disclosed technology, each of memory chips 182, 184, 186, 188 can include at least one memory plane. For example, a memory chip may include a set of components arranged on a substrate. The memory chips 182, 184, 186, 188 coupled to the controller 130 through the data channels CH0, CH1 can include an interface circuit or module for transferring data and signals between the controller 130 and the memory chips 182, 184, 186, 188. Also, each of the memory chips 182, 184, 186, 188 can include a memory group including a plurality of non-volatile memory cells. The plurality of non-volatile memory cells may be coupled through a plurality of word lines and a plurality of bit lines. Each of the memory chip 182, 184, 186, 188 can include a plurality of memory planes or a plurality of memory blocks 152, 154, 156 shown in FIG. 2.

In some embodiments of the disclosed technology, each of the memory chips 182, 184, 186, 188 can include a memory group including a plurality of volatile memory cells. For example, each of the memory chip 182, 184, 186, 188 can include a plurality of memory banks.

Here, each of the memory chip 182, 184, 186, 188 is discussed as an example of a device or a component for transmitting and receiving data through a channel or a data path through which data is transferred. Each of the plurality of memory chips 182, 184, 186, 188 can include a transceiver for transmitting and receiving data transferred via a channel. In addition, each of the memory chips 182, 184, 186, 188 can include an interrupt circuit 192 connected to interrupt lines INT_L0, INT_L2 for transmitting and receiving interrupt signals.

In an implementation, when the controller 130 outputs an interrupt signal to a specific memory chip via the interrupt line INT_L0, INT_L2, the specific memory chip holds off its data transmissions in response to the interrupt signal. In a case that a malfunction or an unexpected situation occurs during a data input/output operation or a data transfer operation, the controller 130 can send an interrupt signal to at least one of the plurality of memory chips 182, 184, 186, 188. In another implementation, the controller 130 can generate the interrupt signal in response to a control signal or a command by an external device such as a host shown in FIG. 2. The plurality of memory chips 182, 184, 186, 188 can reset parameters associated with a data input/output operation in response to the interrupt signal generated by the controller 130.

In an embodiment of the disclosed technology, an interrupt circuit 192 can cause a potential change to the first interrupt line INT_L0 connected to the first memory chip 192 before the first memory chip 192 activates a transceiver for inputting and outputting data item. For example, the interrupt circuit 192 may generate an interrupt signal and output the interrupt signal via the first interrupt line INT_L0. When the interrupt circuit 192 in the first memory chip 192 generates the interrupt signal, an interrupt circuit included in another memory chip (e.g., the second memory chip 184) connected through the first interrupt line INT_L0 can prevent the other memory chip from transmitting or receiving data via the first data channel CH0 corresponding to the first interrupt line INT_L0. The interrupt circuit 192 in the first memory chip 192 can activate a transceiver 194 (see FIGS. 5 and 6) connected to the first data channel CH0, after providing the interrupt signal to the first interrupt line INT_L0. Even if a memory chip is transmitting or receiving data through the first data channel CH0, that memory chip stops transmitting/receiving the data when another memory chip generates an interrupt signal for the first data channel CH0, thereby avoiding a data collision at the first data channel CH0 shared by the first memory chip 182 and the second memory chip 184.

Each of the memory chip 182, 184, 186, 188 can generate an interrupt signal before transmitting and receiving data. Here, the interrupt signal is different and distinguishable from an interrupt signal that is generated by the controller 130 based on an operation state of the plurality of memory chips 182, 184, 186, 188, which is detected by the controller 130. The controller 130 can receive the operation state from the plurality of memory chips 182, 184, 186, 188 through a preset communication method (e.g., a preset protocol), and generate the interrupt signal or a command for avoiding competition at a specific data channel. However, if a data communication of a certain memory chip 182, 184, 186, and/or 188 is scheduled to transmit data, each of the memory chips 182, 184, 186, 188 would have to wait until the controller 130 generates a command or an interrupt signal to avoid potential conflicts. Accordingly, the operation margin of the controller for generating the command or the interrupt signal can lead to a degradation of data input/output rates. However, some embodiments of the disclosed technology can allow each of the memory chips 182, 184, 186, 188 to generate an interrupt signal that enables accessing shared data channels without contention. In response to the interrupt signal generated by other memory chips, a memory chip that shares a data channel with the other memory chips can hold off its data transmission/reception. Through this procedure, the plurality of memory chips 182, 184, 186, 188 can access the shared data channel without conflicts and delays of the data input/output operations, thereby improving the efficiency of the data input/output operation.

In some implementations, the data communication operations between the plurality of memory chips 182, 184, 186, 188 and the controller 130 included in the memory system 110 shown in FIG. 1 can be performed without any conflicts in the use of the data channels CH0, CH1. The embodiments of the disclosed technology discussed in this patent document can be applied to a plurality of systems or devices that is connected through a shared data path (e.g., a channel, a bus or etc.) to perform a data communication.

Figure 2:
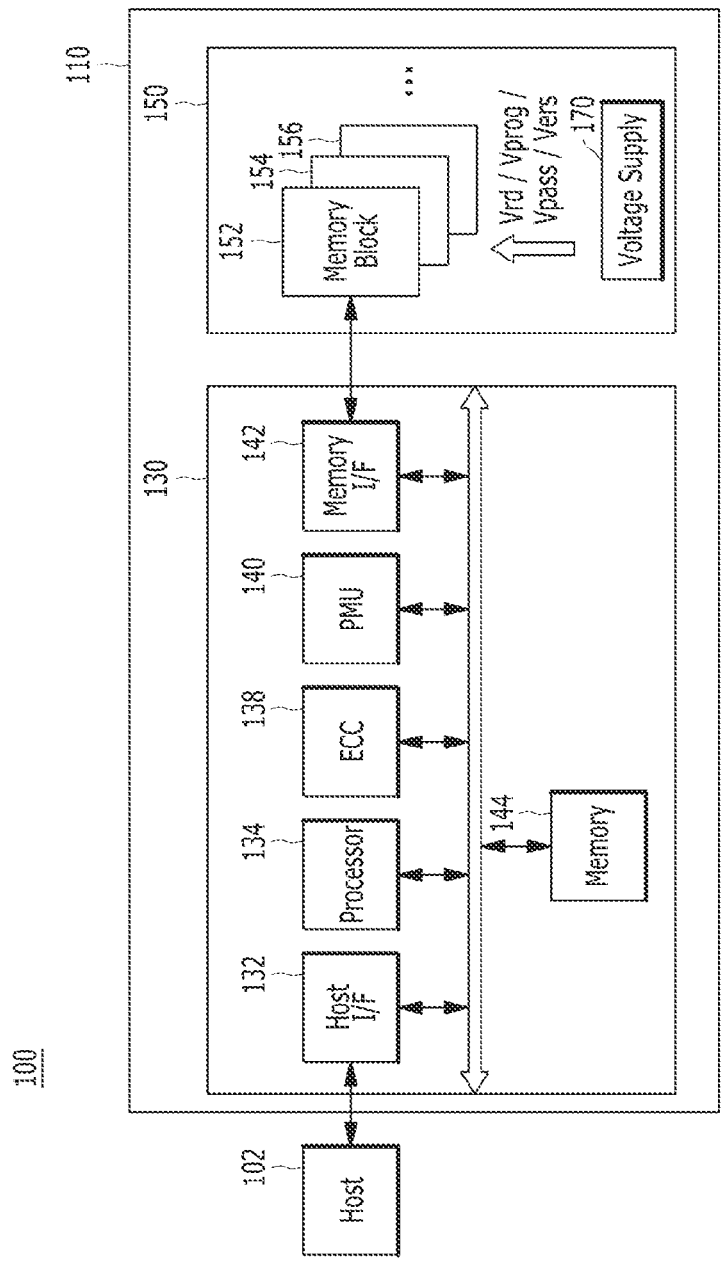
FIG. 2 illustrates an example of a data processing system based on some embodiments of the disclosed technology.

FIG. 2 illustrates an example of a data processing system based on some embodiments of the disclosed technology.

Referring to FIG. 2, the data processing system 100 may include a host 102 coupled to or in communication with a memory system 110. For example, the host 102 and the memory system 110 can be coupled to each other via a data bus, a host cable and others to perform a data communication.

The memory system 110 may include a memory device 150 and a controller 130. The memory device 150 and the controller 130 in the memory system 110 may be physically separated from each other. The memory device 150 and the controller 130 may be connected via at least one data path. For example, the data path may include a channel and/or a way.

In some embodiments of the disclosed technology, the memory device 150 and the controller 130 may be functionally divided components or elements. In some embodiments of the disclosed technology, the memory device 150 and the controller 130 may be incorporated into a single chip or a plurality of chips. For example, the memory device 150 can include the plurality of memory chips 182, 184, 186, 188 shown in FIG. 1 to increase its memory capacity. The controller 130 may perform a data input/output operation in response to a request by the external device. For example, when the controller 130 performs a read operation in response to a read request by an external device by reading out data stored in a plurality of non-volatile memory cells included in the memory device 150.

As shown in FIG. 1, the memory device 150 may include a plurality of memory blocks 152, 154, 156. The memory block 152, 154, 156 may be a number of non-volatile memory cells, which are the smallest unit that can be erased by a single erase operation. Although not illustrated, each of the memory blocks 152, 154, 156 may include a number of pages. Each page may include a number of non-volatile memory cells, which are the smallest unit that can be read from or written to by a single program operation or a single read operation.

For example, the memory device 150 may include a plurality of memory planes or a plurality of memory dies. In some embodiments of the disclosed technology, the memory plane may include a logical or a physical partition including at least one memory block, a driving circuit configured to control an array of non-volatile memory cells, and a buffer that can temporarily store data that is being written to or read from non-volatile memory cells.

In addition, based on some embodiments of the disclosed technology, the memory die may include at least one memory plane. The memory die may include a set of components arranged on a substrate. Each memory die may be connected to the controller 130 through a data path. Each memory die may include an interface for transferring data and signals between the controller 130 and the memory die.

In some embodiments of the disclosed technology, the memory device 150 may include at least one memory block 152, 154, 156, at least one memory plane, or at least one memory chip. The internal configuration of the memory device 150 may be different from what is shown in FIG. 2.

Referring to FIG. 2, the memory device 150 may include a voltage supply circuit 170 to apply voltage to the memory block 152, 154, 156. The voltage supply circuit 170 may apply a read voltage Vrd, a program voltage Vprog, a pass voltage Vpass, or an erase voltage Vers to non-volatile memory cells included in the memory block. For example, during a read operation for reading data from the non-volatile memory cell included in the memory block 152, 154, 156, the voltage supply circuit 170 may apply the read voltage Vrd to a selected non-volatile memory cell. During a program operation for writing data to the non-volatile memory cell included in the memory block 152, 154, 156, the voltage supply circuit 170 may apply the program voltage Vprog to a selected non-volatile memory cell. Also, during a read operation or a program operation performed on the selected nonvolatile memory cell, the voltage supply circuit 170 may apply a pass voltage Vpass to a non-selected nonvolatile memory cell. During an erase operation for erasing data from the non-volatile memory cell included in the memory block 152, 154, 156, the voltage supply circuit 170 may apply the erase voltage Vers to the memory block.

The memory device 150 may store information regarding various voltages that will be applied to the memory block 152, 154, 156 during the program, read and erase operations. For example, when a non-volatile memory cell in the memory block 152, 154, 156 can store multi-bit data, a plurality of levels of the read voltage Vrd can be used to distinguish between different threshold voltage distributions of memory cells. The memory device 150 may include a table that includes information corresponding to the plurality of levels of the read voltage Vrd corresponding to the multi-bit data. For example, the table can include bias values stored in a register such that each bias value corresponds to a specific level of the read voltage Vrd. The number of bias values for the read voltage Vrd that are used for a read operation may be limited to a preset range. Also, the bias values can be quantized.

The host 102 may include a portable electronic device (e.g., a mobile phone, an MP3 player, a laptop computer, etc.) or a non-portable electronic device (e.g., a desktop computer, a game machine, a television, a projector, etc.).

The host 102 may also include at least one operating system (OS) that supports functions and performs operations of the host 102. The OS can act as an intermediary between the host 102 in communication with the memory system 110 and a user who intends to store data in the memory system 110. The OS may support functions and perform operations corresponding to the user's requests. By way of example but not limitation, the OS can be classified into a general operating system and a mobile operating system depending on the mobility of the host 102. The general operating system may be split into a personal operating system and an enterprise operating system depending on system requirements or a user environment. Different from the personal operating system, the enterprise operating systems offer better security functions and a high performance computing.

The mobile operating system may support services or functions needed for mobile devices (e.g., a power saving function). The host 102 may include a plurality of operating systems. The host 102 may include multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command by the host 102. For example, the controller 130 may perform a read operation to provide data read from the memory device 150 to the host 102 and may perform a write operation (or a program operation) to store data of the host 102 in the memory device 150. In order to perform data input/output (I/O) operations, the controller 130 may control internal operations of reading data, programming data, erasing data, or others.

In some embodiments of the disclosed technology, the controller 130 may include a host interface 132, a processor 134, error correction circuitry (ECC) 138, a power management unit (PMU) 140, a memory interface 142, and a memory 144. The controller 130 may include components different from what is illustrated in FIG. 2 depending on the structure, function, operation performance of the memory system 110.

For example, the memory system 110 may include any of various types of storage devices, which may be electrically coupled with the host 102, according to a protocol of a host interface. Examples of the storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick.

Each of the host 102 and the memory system 110 may include a controller or an interface for transmitting and receiving commands, data and other electrical signals in accordance with one or more predetermined protocols. For example, the host interface 132 in the memory system 110 may include an apparatus that transmits or receives commands, data and other electrical signals to or from the host 102.

The host interface 132 included in the controller 130 may receive commands (or requests), data and other electrical signals from the host 102. For example, the host 102 and the memory system 110 may use a predetermined protocol to transmit and receive data therebetween. Examples of protocols or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI). In some embodiments of the disclosed technology, the host interface 132 includes a layer for exchanging data between the host 102 and other devices and includes firmware such as a host interface layer (HIL).

The Integrated Drive Electronics (IDE) or Advanced Technology Attachment (ATA) may be used the interface for transmitting and receiving data and, for example, may use a cable including a number of (e.g., 40) wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a kind of serial data communication interface that is compatible with various ATA standards of parallel data communication interfaces which are used by Integrated Drive Electronics (IDE) devices. The forty wires in the IDE interface can be reduced to six wires in the SATA interface. For example, forty parallel signals for the IDE can be converted into six serial signals for the SATA interface. The SATA interface has been widely used because of its faster data transmission and reception rate and its less resource consumption in the host 102 used for the data transmission and reception. The SATA interface may connect up to thirty external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a kind of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second (e.g., 250 MB/s, 500 MB/s, 984.6250 MB/s, or 1969 MB/s). In some embodiments of the disclosed technology, the PCIe scheme may achieve bandwidths of tens to hundreds of Giga bits per second. The NVMe can support an operation speed of the non-volatile memory system 110, such as an SSD, that is faster than a hard disk.

In some embodiments of the disclosed technology, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

In some embodiments of the disclosed technology, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes.

For example, the ECC decoder may perform a hard decision decoding or a soft decision decoding on data transmitted from the memory device 150. In an example, the hard decision decoding may correct an erroneous bit by reading "0" bit or "1" bit of data from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

In some embodiments of the disclosed technology, the ECC decoder may use a low-density parity-check and generator matrix (LDPC-GM) code for the soft decision decoding. The low-density parity-check (LDPC) code uses an algorithm that can read several bits as values of data from the memory device 150, instead of simply reading value "1" or value "0" like the hard decision decoding, and iteratively repeats it through a message exchange in order to improve the reliability of the read values. Then, the read values are finally determined as "1" or "0." For example, a decoding algorithm using LDPC codes can be understood as probabilistic decoding. Different from the hard decision decoding, the soft decision decoding can determine the value stored in the non-volatile memory cell based on the stochastic information. In dealing with bit-flipping errors that can occur in the memory device 150, the soft decision decoding may offer an improved error correction capacity. In some implementations, the LDPC-GM code may include internal LDGM codes that are concatenated in series with high-speed LDPC codes.

In some embodiments of the disclosed technology, the ECC decoder may use, for example, low-density parity-check convolutional codes (LDPC-CCs) for the soft decision decoding. The error correction associated with the LDPC-CCs may use a linear time encoding and a pipeline decoding based on a variable block length and a shift register.

In some embodiments of the disclosed technology, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control a power supply for the controller 130. The PMU 140 may monitor the electric power supplied to the memory system 110 (e.g., a voltage supplied to the controller 130) and provide the electric power to components included in the controller 130. The PMU 140 may detect whether the memory system 110 is powered on or off and may generate a trigger signal to enable the memory system 110 to use a backup power source when the electric power supplied to the memory system 110 is unstable. In some embodiments of the disclosed technology, the PMU 140 may include a device or a component that can recharge multiple times using an applied electric current to use electric power when there is no power source connected.

The memory interface 142 may serve as an interface for handling commands and data transferred between the controller 130 and the memory device 150, in order to allow the controller 130 to control the memory device 150 in response to a command or a request of the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

In some embodiments of the disclosed technology, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data provided by the host 102 in the memory 144 before programming the write data in the memory device 150. When the controller 130 controls operations, such as a data read operation, a data write or program operation, a data erase operation of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. In some embodiments of the disclosed technology, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may include a volatile memory device. For example, the memory 144 may include a static random access memory (SRAM), a dynamic random access memory (DRAM), or both. Although FIG. 2 illustrates the memory 144 as disposed within the controller 130 by way of example, the disclosed technology is not limited thereto. The memory 144 may be located within or outside the controller 130. For instance, the memory 144 may include an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request from the host 102. In some embodiments of the disclosed technology, the processor 134 may execute firmware operations to control the program operation or the read operation in the memory system 110. Here, the firmware may include a flash translation layer (FTL). Examples of the FTL will be described below with reference to FIGS. 3 and 4. In some embodiments of the disclosed technology, the processor 134 may be include a microprocessor, a central processing unit (CPU) or other similar processors.

In some embodiments of the disclosed technology, the memory system 110 may include at least one multi-core processor. The multi-core processor is a kind of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. Based on some embodiments of the disclosed technology, the data input/output (I/O) operations in the memory system 110 may be independently performed through different cores in the multi-core processor.

The processor 134 in the controller 130 may perform an operation corresponding to a request or a command of the host 102. Further, the memory system 110 may perform an operation independent from a command or a request of the host 102. In one example, an operation performed by the controller 130 in response to the request or the command of the host 102 may be considered a foreground operation, while an operation performed by the controller 130 independently from the request or the command by the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. As a background operation that is performed without a command transmitted from the host 102, the controller 130 can perform garbage collection (GC), wear leveling (WL), bad block management for identifying and processing bad blocks, or the like.

In an embodiment of the disclosed technology, the same or similar operations may be performed as the foreground operation and the background operation. For example, when the memory system 110 performs a garbage collection operation in response to a request or a command of the host 102 (e.g., Manual GC), the garbage collection operation can be considered a foreground operation. When the memory system 110 performs a garbage collection operation independently of the host 102 (e.g., Auto GC), the garbage collection can be considered a background operation.

When the memory device 150 includes a plurality of dies (or a plurality of chips), each of which includes a plurality of non-volatile memory cells, the controller 130 may perform a parallel processing regarding a plurality of requests or commands by the host 102 in order to improve the performance of the memory system 110. For example, the transmitted requests or commands may be divided into a plurality of groups including at least some of a plurality of planes, a plurality of dies, or a plurality of chips included in the memory device 150, and the plurality of groups of requests or commands can be processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. In some embodiments of the disclosed technology, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in a view of storage capacity.

In an embodiment, the memory device 150 may include MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can include a block including a plurality of pages implemented by memory cells, each memory cell capable of storing five or more bits of data.

In some embodiments of the disclosed technology, the controller 130 may use an MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, in some embodiments of the disclosed technology, the controller 130 can write data to an MLC more than once without performing an erase operation on a specific MLC memory block included in the memory device 150. In general, non-volatile memory cells do not support data overwrite. However, the controller 130 may write 1-bit data in the MLC more than once because the MLC can be used to store multi-bit data. For an MLC overwrite operation, the controller 130 may store the number of write (program) operations as separate operation information when 1-bit data is written to an MLC. In some embodiments of the disclosed technology, write (program) operations can be performed such that threshold voltages of the MLCs are evenly distributed before another 1-bit data write or program operation is performed.

In an embodiment, the memory device 150 includes a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Figure 3:
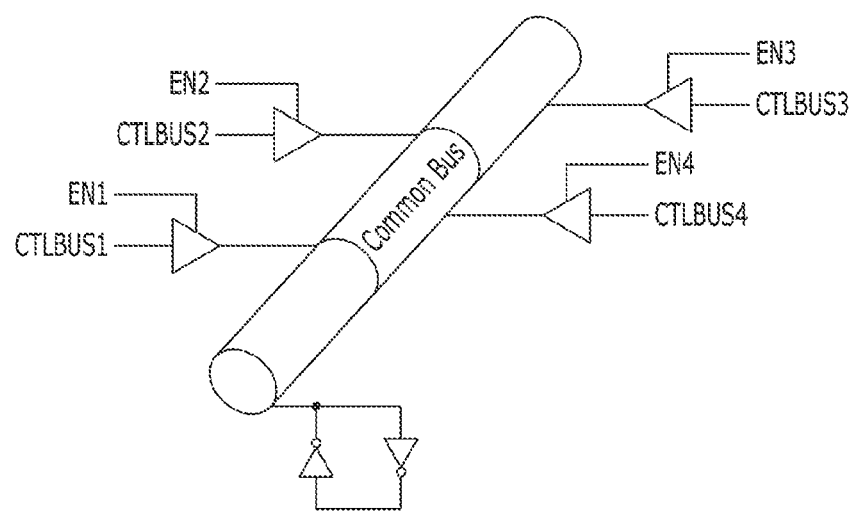
FIG. 3 illustrates an example of a data path coupled to a plurality of devices.

FIG. 3 illustrates an example of a data path coupled to a plurality of devices.

Referring to FIG. 3, a plurality of transceivers is connected to a data path (Common Bus). The data path is shared by the plurality of transceivers. Each of the transceiver can transmit or receive data via the data path (Common Bus) shared by the plurality of transceivers, in response to enable signals EN1, EN2, EN3, EN4 and bus control signals CTLBUS1, CTLBUS2, CTLBUS3. Because the plurality of transceivers shares a single data path (Common Bus), the plurality of transceivers should transmit or receive data via the data path (Common Bus) at different timings or activation periods. When multiple transceivers simultaneously transmit or receive data on the single data path (Common Bus) or when the activation periods of the enable signals EN1, EN2, EN3, EN4 are partially overlapped with each other, it might be difficult to ensure integrity of the data transferred via the data path (Common Bus).

Figure 4:
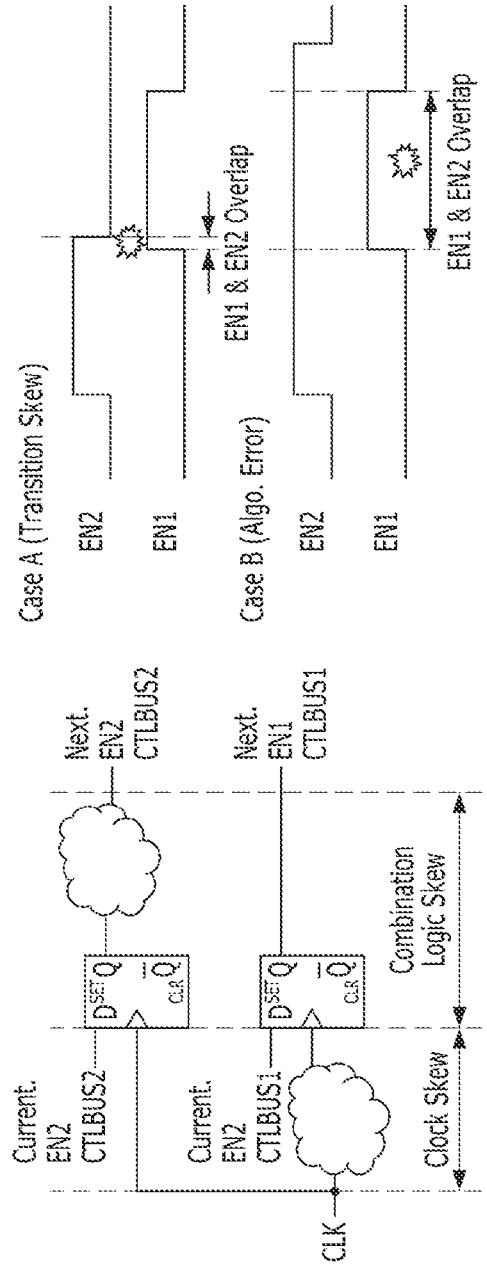
FIG. 4 illustrates an example data communication carried out via the data path shown in FIG. 3.

FIG. 4 illustrates an example data communication via the data path shown in FIG. 3.

Referring to FIG. 4, a control circuit for controlling the plurality of transceivers described in FIG. 3 can transfer data in response to the enable signals EN1, EN2, EN3, EN4 and the bus control signals CTLBUS1, CTLBUS2, CTLBUS3 which are supplied to the plurality of transceivers based on a clock signal CLK. The clock signal CLK input to the control circuit might be delayed or skewed due to various reasons such as a resistance. Here, a skew may include a phenomenon in which a certain signal originally having the same or the same phase is shifted at an arrival point. For example, when a bit stream is transmitted simultaneously through two lines or channels, the bit stream might not be reached at the same time when the bit stream arrives. When the bit stream arrives with a time difference, it can be understood that a timing skew has occurred. Even if there are not two lines, a situation in which clock timings at a transmission terminal and a reception terminal are not synchronized can be expressed as the skew. When a skew of the clock signal CLK occurs, a skew can occur in processing the enable signals EN1, EN2, EN3, EN4 and the bus control signals CTLBUS1, CTLBUS2, CTLBUS3, which are used for controlling the plurality of transceivers.

FIG. 4 shows two cases as examples. In a first situation (Case A), a skew occurs in processing the clock signal CLK, the enable signals EN1, EN2, EN3, EN4 and the bus control signals CTLBUS1, CTLBUS2, CTLBUS3. Although the enable signals EN1, EN2 controlling different transceivers are designed to be activated at different timings or sequentially, some parts of the activation periods of the enable signals EN1 and EN2 might be overlapped with each other due to the occurrence of skew. An overlapping problem arises. When the parts of the activation periods of the enable signals EN1, EN2 overlaps, it might be difficult to ensure integrity of data transmitted through a data path shared by two transceivers. In this case, in order to prevent an error, the control circuit should delay the activation periods of the first enable signal EN1 or shorten the activation periods of the second enable signal EN2.

When different transceivers share a data path, different transceivers are designed to input/output data to/from the data path at different timings. However, in a second situation (Case B), an operation error might cause an overlap between the activation periods of the enable signals EN1, EN2, even though the enable signals EN1, EN2 are activated for different transceivers to input/output data at different timings. In this case, since the integrity of data transmitted through the shared data path might not be guaranteed, the control circuit should deactivate one of the enable signals EN1, EN2 to prevent an error.

Figure 5:
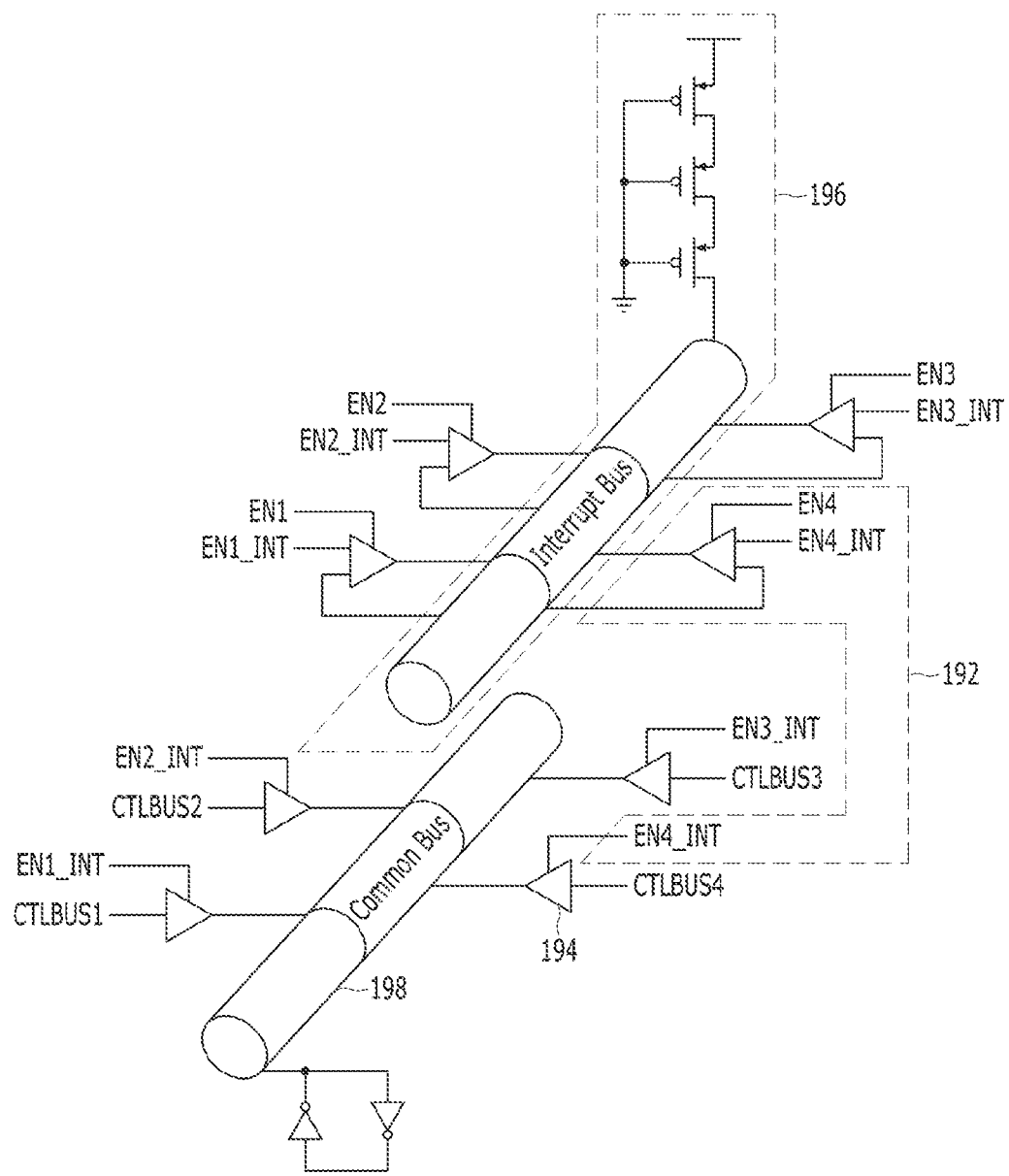
FIG. 5 illustrates an example of a data communication apparatus, a data path and an interrupt path based on some embodiments of the disclosed technology.

FIG. 5 illustrates an example of a data communication apparatus, a data path and an interrupt path based on some embodiments of the disclosed technology.

Referring to FIG. 5, a plurality of data communication apparatuses can be coupled to a data path 198 and an interrupt path 196. That is, a plurality of data communication apparatuses can share the data path 198 and an interrupt path 196. Each data communication apparatus can include a transceiver 194 and an interrupt circuit 192. The transceiver 194 can include a tri-state buffer capable of inputting and outputting data in response to a control signal. The transceiver 194 and the interrupt circuit 192 included in each of the data communication apparatus can be coupled to the data path 198 and the interrupt path 196.

There is a difference between the data communication apparatuses shown in FIG. 3 and FIG. 5 with each other. The enable signals EN1, EN2, EN3, EN4 for transmitting and receiving data are not directly input to the transceiver 194. But, the enable signals EN1, EN2, EN3, EN4 are input to the interrupt circuit 192. For example, when a fourth enable signal EN4 activated to transmit/receive data is applied to the interrupt circuit 192, the interrupt circuit 192 outputs a fourth control signal EN4_INT for controlling the transceiver 194. The transceiver 194 can input/output data in response to the fourth control signal EN4_INT.

When the fourth enable signal EN4 is input to the interrupt circuit 192, the interrupt circuit 192 can make a change of the interrupt path 196. For example, the interrupt circuit 192 generates an interrupt signal corresponding to the fourth enable signal EN4. When the interrupt signal is applied in the interrupt path 196, a data communication apparatus that has been transmitting and receiving data through the data path 198 can deactivate a control signal for controlling a transceiver included therein. Further, the interrupt circuit 192 can output a fourth control signal EN4_INT corresponding to the fourth enable signal EN4 to the transceiver 194, and the transceiver 194 can transmit/receive data through the data path 198. In response to the fourth enable signal EN4, the interrupt signal is generated before the transceiver 194 uses the data path 198 for data communication. In response to the interrupt signal, another data communication apparatus or another transceiver using the data path 198 can be deactivated before the transceiver 194 uses the data path 198. Accordingly, a collision or a competition for the transceiver 194 to use the data path 198 in response to the fourth enable signal EN4 can be avoided.

Based on some embodiments of the disclosed technology, the data communication apparatus can include the interrupt circuit 192 that interoperates with the transceiver 194. The interrupt circuit 192 can not only make the change in the interrupt path 196, but also recognize a change in the interrupt path 196, which can be made by another apparatus. The interrupt circuit 192 can make the change in the interrupt path 196 for the transceiver 194 of the data communication apparatus to transmit and receive data, and detect the change in the interrupt path 196, which is generated by another interrupt circuit included in another data communication apparatus. Thus, the interrupt circuit 192 can halt or stop an operation of the transceiver 194 in response to the detected change in the interrupt path 196.

Figure 6:
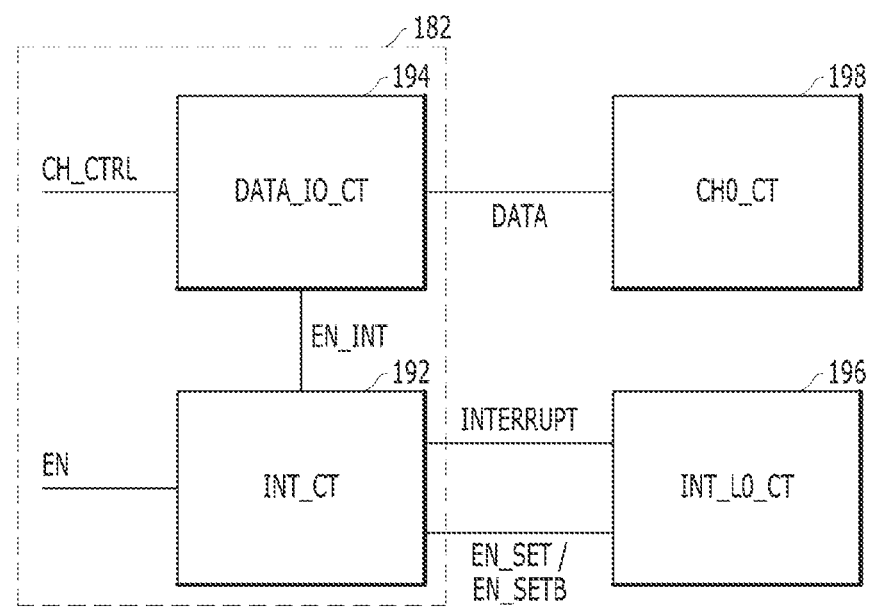
FIG. 6 illustrates an example configuration of the memory device shown in FIGS. 1 and 2.

The data communication device including the transceiver 194 and the interrupt circuit 192 described with reference to FIG. 5 can be applicable to the memory device 150 described with reference to FIGS. 1 to 2. FIG. 6 illustrates an example configuration of the memory device shown in FIGS. 1 and 2. Specifically, FIG. 6 shows a part of the first memory chip 182 included in the memory device 150 as an example.

Referring to FIG. 6, the first memory chip 182 can include the transceiver 194 and the interrupt circuit 192. The transceiver 194 can be coupled to the data path 198, and the interrupt circuit 192 can be coupled to the interrupt path 196.

The data path 198 can include the first channel CH0 (see FIG. 1). When a length of the first channel CH0 is short, the first channel CH0 can include a wire only for transmitting data. However, when the length of the first channel CH0 is long, a phenomenon in which a size or value of data or signals transferred in the first channel (CH0) is changed (e.g., overshoot/undershoot) might occur. Further, in a low-power circumstance in which a driving power is small (such as a low power device), a phenomenon in which the size or value of data or signals is changed (e.g., overshoot/undershoot) is likely to occur. To avoid the phenomenon (e.g., overshoot/undershoot), the data path 198 can include a latch, a pull up/pull down circuit, or etc. for holding or keeping data or signals transferred via the first channel CH0.

Figure 8:
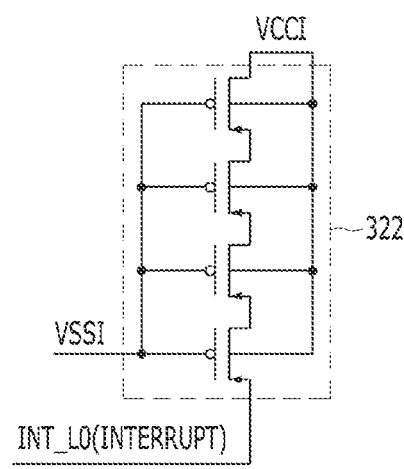
FIG. 8 illustrates an example of a switching circuit coupled to an interrupt path shown in FIG. 7.

The interrupt path 196 can include a first interrupt line INT_L0 and a switching circuit (shown in FIG. 8). Based on some embodiments of the disclosed technology, the first interrupt line INT_L0 (shown in FIG. 1) can be coupled to a switching circuit that can maintain an activated state (e.g., a logic high level) of the first interrupt line INT_L0. Like the data path 198, the first interrupt line INT_L0 can be coupled to other interrupt circuits included in other memory chips.

The first memory chip 182 can activate an enable signal EN to transmit/receive data. When the enable signal EN is activated, the interrupt circuit 192 may make a change in the first interrupt line INT_L0 included in the interrupt path 196. The interrupt circuit 192 can output setup signals EN_SET, EN_SETB to the interrupt path 196 in response to the enable signal EN. Further, the interrupt circuit 192 may detect a change INTERRUPT of the first interrupt line INT_L0. The interrupt circuit 192 can output the control signal EN_INT to the transceiver 194 in response to the enable signal EN and the change INTERRUPT of the first interrupt line INT_L0. The transceiver 194 can transmit data DATA to the first channel CH0 included in the data path 198 in response to a channel control signal CH_CTRL and the control signal EN_INT.

Figure 7:
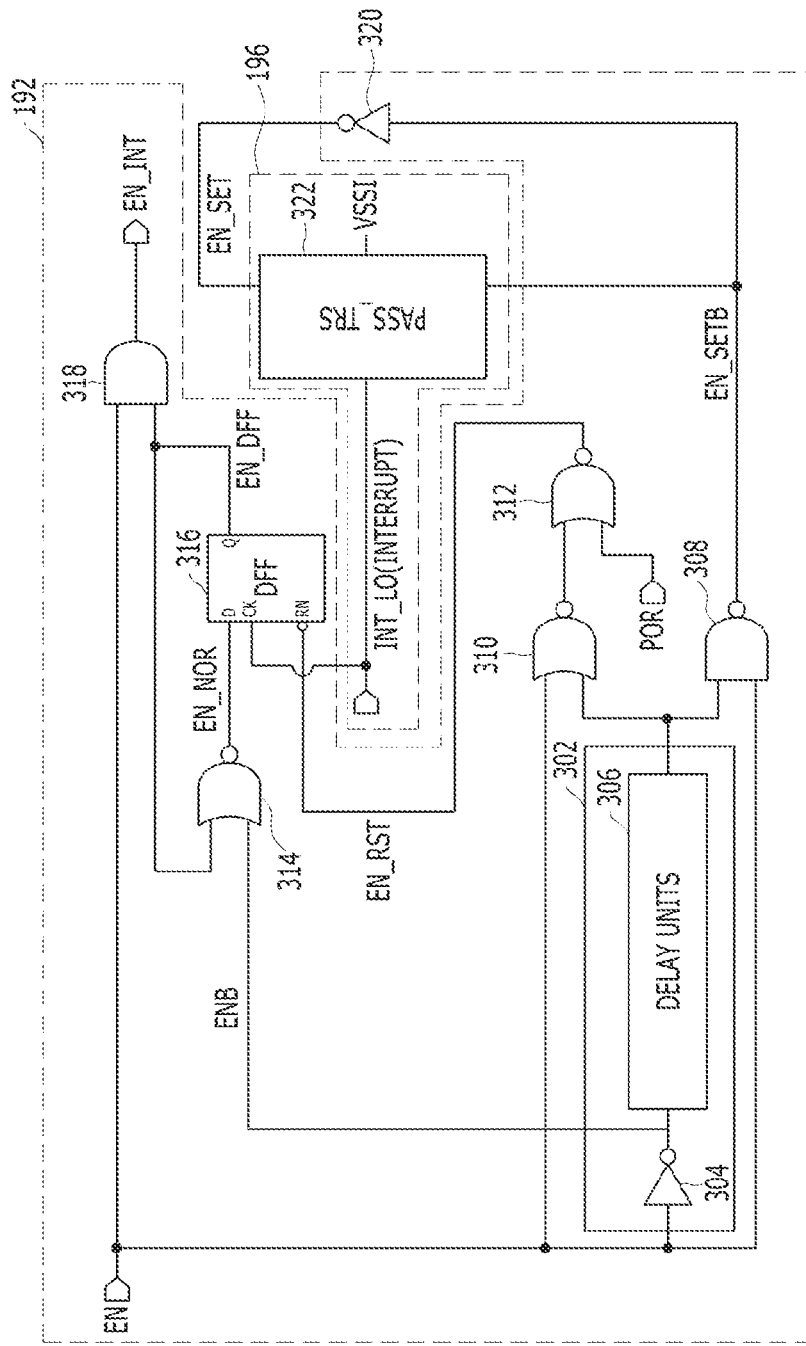
FIG. 7 illustrates an example of an interrupt circuit and an interrupt path.

FIG. 7 illustrates an example of an interrupt circuit and an interrupt path. Specifically, FIG. 7 describes circuit configuration of the interrupt circuit 192 and the interrupt path 196.

Referring to FIG. 7, the interrupt circuit 192 can receive an enable signal EN and a state reset signal POR, and output reset signals EN_SET, EN_SETB and a control signal EN_INT. The interrupt path 196 can include an interrupt line INT_L0 that changes its voltage value based on the reset signals EN_SET, EN_SETB and a switching circuit 322 coupled to the interrupt line INT_L0.

The interrupt circuit 192 can include a delay unit 302 capable of delaying the enable signal EN by a preset time. The delay unit 302 can include a first inverter 304 inverting the enable signal EN to output an enable inverted signal ENB and the delay element 306 delaying the outputs of the first inverter 304 by a preset time. In some embodiments of the disclosed technology, the delay element 306 can include a plurality of inverters serially connected.

The interrupt circuit 192 may include a first NAND gate 308 for performing a NAND operation on the output of the delay unit 302 and the enable signal EN to generate the setup signals EN_SETB, EN_SET. The first NAND gate 308 can output the setup signals EN_SETB, EN_SET having a pulse width corresponding to the delay time of the delay unit 302.

In some embodiments of the disclosed technology, a setup inversion signal EN_SETB output from the first NAND gate 308 can be generated by the second inverter 320 which can convert the setup signal EN_SET. The setup inversion signal EN_SETB and the setup signal EN_SET may be applied to the interrupt path 196.

The interrupt circuit 192 can further include a first NOR gate 310 for performing a NOR operation on the output of the delay unit 302 and the enable signal EN to generate a result of the NOR operation, and a second NOR gate 312 for performing a NOR operation on the output of the first NOR gate 310 and the state reset signal POR to output a result of the NOR operation. The second NOR gate 312 can generate an enable reset signal EN_RST.

The interrupt circuit 192 can include a first AND gate 318 that performs an AND operation on the flip-flop output signal EN_DFF and the enable signal EN to output a control signal EN_INT. In addition, the interrupt circuit 192 can further include a third NOR gate 314 for performing a NOR operation on the flip-flop output signal EN_DFF and the enable inverted signal ENB to output a NOR output signal EN_NOR, and a flip-flop 316 for outputting the NOR output signal EN_NOR output from the third NOR gate 314 as the flip-flop output signal EN_DFF in response to the interrupt signal INTERRUPT.

Referring to FIG. 7, the interrupt signal INTERRUPT transmitted through the interrupt path 196 is applied to a clock input terminal CK of the flip-flop 316. The flip-flop 316 can output the NOR output signal EN_NOR as a flip-flop output signal EN_DFF, in response to the interrupt signal INTERRUPT. Even if the input enable signal EN is activated, the control signal EN_INT output from the first AND gate 318 might not be activated immediately. The control signal EN_INT can be activated according to the flip-flop output signal EN_DFF output by the flip-flop 316 which operates in response to the interrupt signal INTERRUPT. The interrupt circuit 192 can generate an interrupt signal INTERRUPT in the interrupt path 196 in response to the input enable signal EN, and then output the control signal EN_INT for the transceiver 194 (shown in FIG. 6) to input and output data.

According to a status of the enable signal EN, the third NOR gate 314 and the flip-flop 316 can output different results in response to the interrupt signal INTERRUPT. Because the enable inverted signal ENB is inactivated when the enable signal EN is activated, the third NOR gate 314 can serve as an inverter that inverts statuses of the NOR output signal EN_NOR and the flip-flop output signal EN_DFF. That is, a status opposite to a previous status can be output as a next status. However, because the enable inverted signal ENB is activated when the enable signal EN is inactivated, the third NOR gate 314 can make the NOR output signal EN_NOR have an inactivated status. Through these operations, in response to the interrupt signal INTERRUPT, the flip-flop 316 can be deactivated when the control signal EN_INT is activated, as well as maintained in a deactivated status when the control signal EN_INT is inactivated.

In some embodiments of the disclosed technology, a plurality of interrupt circuits can be connected to the interrupt path 196. The interrupt signal INTERRUPT transferred through the interrupt path 196 is also detected by another data communication apparatus or another interrupt circuit included in another memory chip. If there is a transceiver using the first channel CH0 corresponding to the first interrupt line INT_L0, the interrupt circuit corresponding to the transceiver can half or stop the operation of the transceiver in response to the interrupt signal INTERRUPT.

FIG. 8 illustrates an example of a switching circuit 322 coupled to the interrupt path 196 shown in FIG. 7.

Referring to FIGS. 7 and 8, the interrupt line INT_L0 included in the interrupt path 196 can maintain an active state by the switching circuit 322. A voltage of the interrupt line INT_L0 can be changed in response to the setup signals EN_SET, EN_SETB output from any interrupt circuit 192 which is coupled to the interrupt line INT_L0. According to the embodiment, because the interrupt circuit 192 might not include a driver for lowering the potential of the interrupt line INT_L0, the switching circuit 322 can slightly or weakly activate the interrupt line INT_L0. When the switching circuit 322 might drive the interrupt line INT_L0 with too strong power, the potential of the interrupt line INT_L0 might be not meaningfully changed by the interrupt circuit 192.

In some embodiments of the disclosed technology, the switching circuit 322 can include a plurality of transistors connected in series between an internal power voltage VCCI and the interrupt line INT_L0. The plurality of transistors can maintain a turned-on state because each transistor has a gate connected to the internal ground voltage VSSI.

Figure 9:
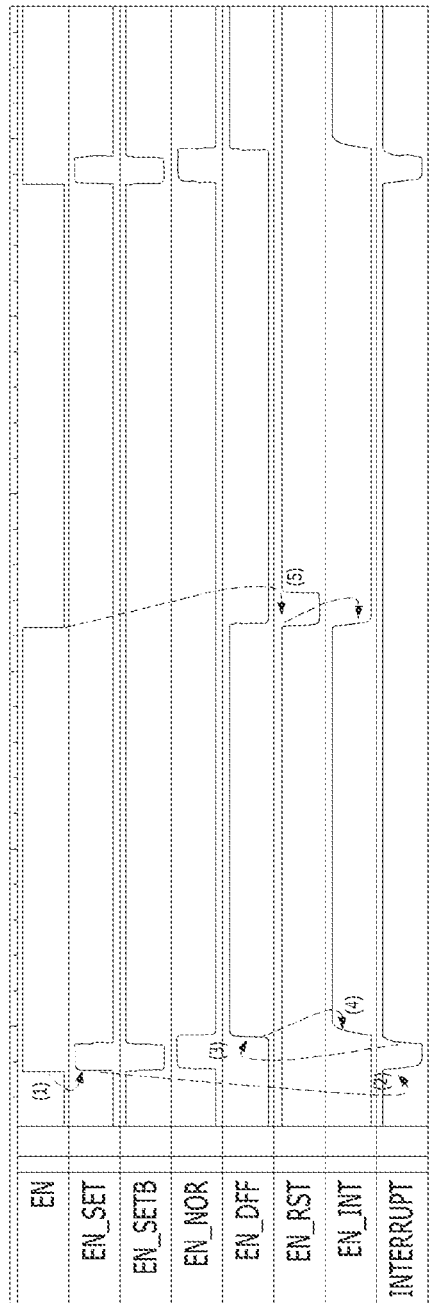
FIG. 9 illustrates an example operation of the interrupt circuit based on some embodiments of the disclosed technology.

FIG. 9 illustrates an example operation of the interrupt circuit. Specifically, FIG. 9 describes an internal operation of the interrupt circuit 192 described with reference to FIG. 7.

The enable signal EN input to the interrupt circuit 192 can be activated. When the enable signal EN is activated, the setup signal EN_SET and the setup inversion signal EN_SETB can be generated while being delayed by the preset time by the delay unit 302 (reference (1)). Meanwhile, in response to the enable inversion signal ENB, the third NOR gate 314 can activate the NOR output signal EN_NOR as a logic high level.

The setup signal EN_SET and the setup inversion signal EN_SETB can be transmitted to the interrupt path 196 to cause the interrupt signal INTERRUPT (reference (2)).

When the interrupt signal INTERRUPT is generated (e.g., in synchronization with a rising edge), the flip-flop 316 can output the NOR output signal EN_NOR as the flip-flop output signal EN_DFF (reference (3)).

When the flip-flop output signal EN_DFF is activated to a logic high level, the first AND gate 318 can activate the control signal EN_INT in response to the enable signal EN (reference (4)). When the control signal EN_INT is activated, data can be input or output through the transceiver 194 (shown in FIG. 6).

Thereafter, the input enable signal EN can be deactivated. The inactivated enable signal EN can inactivate the enable reset signal EN_RST and the control signal EN_INT (reference (5)).

Referring to FIG. 9, in response to the enable signal EN activated for transmitting or receiving data, the interrupt circuit 192 can generate the interrupt signal INTERRUPT and then activate the control signal EN_INT for controlling the transceiver 194. If the interrupt signal INTERRUPT can be generated before data transmission/reception, another transceiver or other data communication device sharing the interrupt path 196 can recognize that another device other than itself is going to perform data transmission/reception. Correspondingly, any transceiver or data communication device having used the data path 198 can stop data input/output operation or data transfer operation, so that the data communication device generating the interrupt signal INTERRUPT can perform may data input/output operation or data transfer operation through a transceiver included therein. Through this procedure, even if a plurality of data communication devices shares a single data path, competition for occupying the data path can be avoided. Accordingly, the integrity of data transmitted through the data path can be secured.

Figure 10:
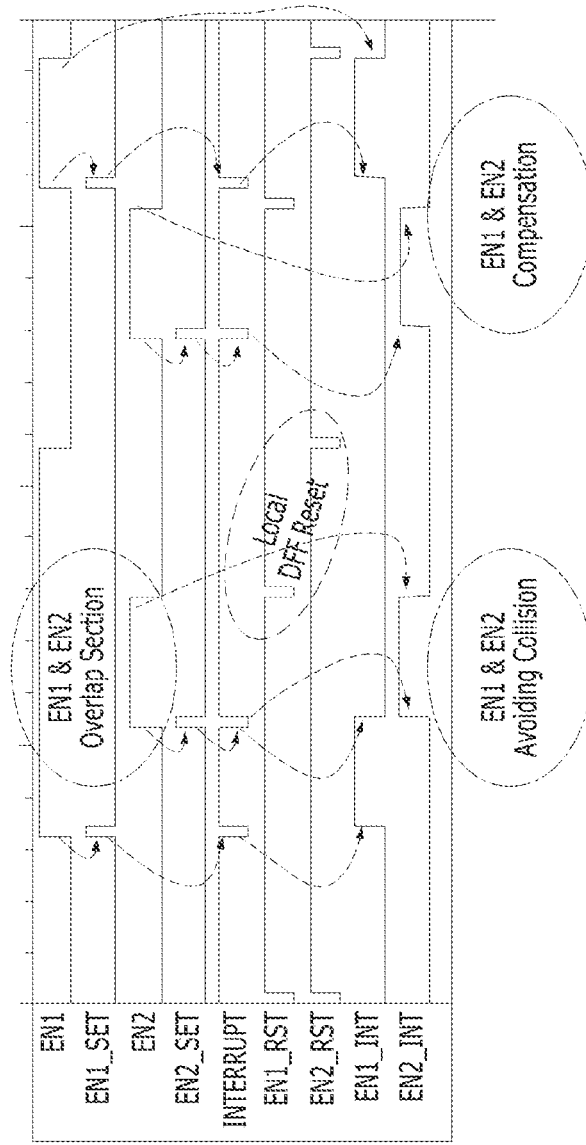
FIG. 10 illustrates example operations of data communication apparatuses.

FIG. 10 illustrates example operations of data communication apparatuses. Specifically, FIG. 10 shows an example in which two data communication devices individually perform data input/output operations.

Referring to FIG. 10, when the first enable signal EN1 is activated to a logic high level, the first setup signal EN1_SET can be activated. When the first setup signal EN1_SET is activated, the interrupt signal INTERRUPT can be generated. In response to the interrupt signal INTERRUPT signal and the first enable signal EN1, the first control signal EN1_INT can be activated. A process in which the first control signal EN1_INT is activated to a logic high level can be substantially the same as that described with reference to FIG. 9.

If the first enable signal EN1 is activated, the second enable signal EN2 can be activated to a logic high level (example described with reference to FIG. 4). When a plurality of data communication devices shares a single communication line, data collision can occur if a data communication device could not control another data communication device before or while the data communication device transfers data. When the second enable signal EN2 is activated to a logic high level, the second setup signal EN2_SET can be activated. When the second setup signal EN2_SET is activated, the interrupt signal INTERRUPT can be generated. When the interrupt signal INTERRUPT is generated, the first control signal EN1_INT can be deactivated and the second control signal EN2_INT can be activated. Through this procedure, it is possible to avoid occurrence of competition for occupying the single communication line, and to secure the integrity of data transferred through the single communication line.

Specifically, the inactivation of the first control signal EN1_INT can be enabled by the operations of the third NOR gate 314 and the flip-flop 316 in the first interrupt circuit that outputs the first control signal EN1_INT (See FIG. 7). When the first enable signal EN is activated, the first enable inverted signal ENB is inactivated so that the third NOR gate 314 can serve as an inverter that inverts statuses of the NOR output signal EN_NOR and the flip-flop output signal EN_DFF. That is, the flip-flop 316 in the first interrupt circuit can output an inactivated status of the first control signal EN1_INT, which is opposite to a previous status of the first control signal EN1_INT, as a next status. Meanwhile, a third NOR gate and a flip-flop in a second interrupt circuit for outputting a second control signal EN2_INT can output an activated status of the second control signal EN2_INT which is opposite to a previous status of the second control signal EN2_INT, as a next status. Accordingly, in response to the interrupt signal INTERRUPT, the first control signal EN1_INT can be deactivated, while the second control signal EN2_INT can be activated.

Thereafter, when the second enable signal EN2 is inactivated, the second control signal EN2_INT can also be inactivated. As described above, even when the second enable signal EN2 is activated to a logic high level due to a malfunction in a state in which the first enable signal EN1 is activated, the first control signal EN1_INT can be inactivated in response to an activation of the second enable signal EN2 and the second control signal EN2_INT can be activated. Accordingly, two transceivers sharing a single data path can avoid collision by receiving or transferring data according to the first control signal EN1_INT and the second control signal EN2_INT.

In some embodiments of the disclosed technology, after the first control signal EN1_INT and the second control signal EN2_INT are inactivated, a state reset signal POR (shown in FIG. 7) can be applied to the interrupt circuit. Herein, the state reset signal POR can be applied to the first interrupt circuit after a preset time as the inactivation time of the first control signal EN1_INT. Also, the state reset signal POR can be applied to the second interrupt circuit after a preset time from the inactivation time of the second control signal EN2_INT. Through these operations, flip-flops included in the first and second interrupt circuits can be reset (LOCAL DFF RESET).

In a subsequent operation, after the second enable signal EN2 is activated, the second setup signal EN2_SET can be activated. When the second setup signal EN2_SET is activated, the interrupt signal INTERRUPT can be generated. When the interrupt signal INTERRUPT is generated, the second control signal EN2_INT can be activated. In this case, because the first enable signal EN1 is in an inactive status, the first control signal EN1_INT might be not activated even when the interrupt signal INTERRUPT is generated. Thereafter, when the second enable signal EN2 is inactivated, the second control signal EN2_INT may also be inactivated.

After the second enable signal EN2 is inactivated, the first enable signal EN1 can be activated. When the first enable signal EN1 is activated as a logic high level, the first setup signal EN1_SET can be activated. When the first setup signal EN1_SET is activated, the interrupt signal INTERRUPT can be generated. In response to the interrupt signal INTERRUPT signal and the first enable signal EN1, the first control signal EN1_INT can be activated. Even in this case, because the second enable signal EN1 is in an inactive state, the second control signal EN2_INT might be not activated even when the interrupt signal INTERRUPT is generated. Thereafter, when the first enable signal EN1 is inactivated, the first control signal EN1_INT may also be inactivated.

As described above, when two transceivers sharing one data path transmits and receives data at different timings (that is, when the first control signal EN1_INT and the second control signal EN2_INT are activated at different timings), each transceiver can reliably transmit and receive data through the shared data channel without interfering with another transceiver.

Figure 11:
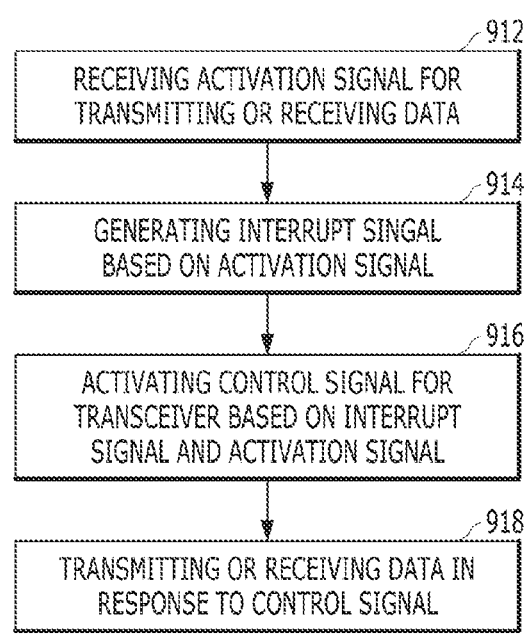
FIG. 11 illustrates how to perform data communication based on some embodiments of the disclosed technology.

FIG. 11 illustrates how to perform data communication based on some embodiments of the disclosed technology.

Referring to FIG. 11, a method of performing data communication can include receiving an activation signal for transmitting and receiving data (at 912), generating a first interrupt signal based on the activation signal (at 914), activating a control signal for a transceiver in response to the activation signal and the first interrupt signal (at 916), and transmitting or receiving data through the transceiver in response to the control signal (at 918). In some embodiments of the disclosed technology, the activation signal can correspond to the enable signal EN described with reference to FIGS. 7 to 10, and the control signal can correspond to the control signal EN_INT described with reference to FIGS. 7 to 10.

Here, the data path through which the transceiver transmits and receives data can be shared by another transceiver. That is, a plurality of transceivers or a plurality of data communication devices can transmit or receive data through a shared data path. Meanwhile, the first interrupt signal may be transferred through an interrupt path instead of the data path. The plurality of transceivers or the plurality of data communication devices sharing the data path can also share an interrupt path corresponding to the data path.

Although not shown, the method of performing data communication can further include maintaining a first state for inactivating the control signal and inactivating the control signal in response to the first state and the second interrupt signal. The data communication device can inactivate a previously activated control signal in response to a second interrupt signal generated after activating the control signal for the transceiver. Herein, the first interrupt signal and the second interrupt signal can be generated and output from different data communication devices.

In some implementations, the method of performing data communication can further include inactivating the control signal when the activation signal is inactivated. Also, the method of performing data communication can further include applying a state reset signal after the control signal is inactivated. Through this, even if a plurality of transceivers shares a single data path to transmit or receive data, collision can be avoided. Each transceiver can perform an operation of transmitting or receiving data at different (i.e., not overlapped) time periods.

Although the memory system based on some embodiments of the disclosed technology includes a plurality of memory devices, it is possible to avoid collisions occurring in data input/output processes so that the memory system can improve a safety of data input/output operations.

In addition, the memory system based on some embodiments of the disclosed technology can avoid overlapped transmissions of a signal or data via a plurality of transceivers, so that data integrity can be ensured during data communication using a data path shared by the plurality of transceivers.

While various embodiments have been described, it will be apparent to those skilled in the art that various changes and modifications may be made based on the disclosure of this patent document.

What is claimed is:

1. A data communication apparatus, comprising:
a transceiver coupled to a data path and configured to transmit or receive data through the data path; and
an interrupt circuit coupled to an interrupt path corresponding to the data path and configured to determine whether to allow any apparatus to occupy the data path, wherein the data path is structured to carry first data transmitted by the data communication apparatus and second data transmitted by another apparatus, and the interrupt path comprises a first line structured to carry a first interrupt signal transmitted by the data communication apparatus and a second interrupt signal transmitted by the other apparatus at different times, wherein the first line is coupled to a switching circuit comprising a plurality of transistors serially connected between a power supply terminal for providing voltages and the first line,
wherein the interrupt circuit generates the first interrupt signal for preventing the other apparatus from accessing the data path in response to an activation signal for transmitting or receiving the first data through the transceiver.

2. The data communication apparatus according to claim 1, wherein the interrupt circuit is further configured to deactivate the transceiver upon receipt of the second interrupt signal via the interrupt path.

3. The data communication apparatus according to claim 2, further comprising:
a memory group coupled to the data path, the memory group including a plurality of volatile memory cells or a plurality of non-volatile memory cells structured to store data.

4. The data communication apparatus according to claim 1, wherein the interrupt circuit generates a control signal for activating the transceiver, after generating the first interrupt signal in response to the activation signal.

5. The data communication apparatus according to claim 4, wherein the transceiver comprises a tri-state buffer configured to transmit or receive data based on the control signal.

6. The data communication apparatus according to claim 2,
wherein the second interrupt signal is generated by the other apparatus.

7. A system, comprising:
a data path via which a plurality of transceivers is capable of transmitting data, the data path structured to carry the data transferred from one transceiver to another transceiver of the plurality of transceivers; and an interrupt path via which a plurality of interrupt circuits is capable of transmitting an interrupt signal, the interrupt path structured to carry the interrupt signal for interrupting access to the data path corresponding to the interrupt path, wherein a first interrupt circuit of the plurality of interrupt circuits generates a first interrupt signal that is transmitted through the interrupt path to interrupt access by the plurality of transceivers before a first transceiver corresponding to the first interrupt circuit transmits data via the data path, wherein the interrupt path comprises a first line structured to carry the first interrupt signal transmitted by the first transceiver and a second interrupt signal transmitted by a second transceiver different from the first transceiver at different times, wherein the first line is coupled to a switching circuit comprising a plurality of transistors serially connected between a power supply terminal for providing voltages and the first line.

8. The system according to claim 7, further comprising:
a plurality of memory chips, each memory chip including at least one of an array of volatile memory cells or an array of non-volatile memory cells; and
a controller configured to control a data input/output operation performed in the plurality of memory chips, wherein each of the plurality of memory chips comprises one of the plurality of transceivers and one of the plurality of interrupt circuits, and
wherein the data path comprises at least one channel structured to couple the controller to the plurality of memory chips.

9. The system according to claim 7, wherein the first interrupt circuit is configured to deactivate the first transceiver upon receipt of the second interrupt signal via the interrupt path.

10. The system according to claim 7, wherein the first interrupt circuit is configured to generate a control signal for activating the first transceiver, after generating the first interrupt signal in response to a first signal that is input to the first transceiver for transmitting the data.

11. The system according to claim 10, wherein the first transceiver comprises a tri-state buffer configured to transmit or receive the data based on the control signal.

12. The system according to claim 7, wherein the switching circuit is configured to activate or deactivate the first line in response to a set-up signal provided by the plural interrupt circuits.

13. The system according to claim 10, wherein the first interrupt circuit comprises:
a first component configured to generate a set-up signal for activating the interrupt path in response to the first signal;
a second component configured to generate a control signal for activating the first transceiver in response to the first signal;
a third component configured to deactivate the control signal upon activating the interrupt path; and
a fourth component configured to reset the control signal based on a status reset signal.

14. The system according to claim 13, wherein the first component comprises a delay unit configured to delay the first signal by a preset time.

15. A data communication method, comprising:
receiving an activation signal for transmit or receive data through a first device of a plurality of devices via a data path via which the plurality of devices is capable of transmitting or receiving data;
generating a first interrupt signal for interrupting access by the plurality of devices based on the activation signal, wherein the first interrupt signal is transmitted via an interrupt path via which the plurality of devices is capable of transmitting an interrupt signal, wherein the interrupt path comprises a first line structured to carry the first interrupt signal transmitted by the first device and a second interrupt signal transmitted by a second device different from the first device at different times, wherein the first line is coupled to a switching circuit comprising a plurality of transistors serially connected between a power supply terminal for providing voltages and the first line;
activating a control signal to be applied to the first device based on the first interrupt signal and the activation signal; and
transmitting or receiving the data through the first device based on the control signal.

16. The method according to claim 15, further comprising:
maintaining a first status for deactivating the control signal while the activation signal is not input; and
deactivating the control signal based on the first status and the second interrupt signal.

17. The method according to claim 16, wherein the second interrupt signal is output by the second device of the plurality of devices different from the first device.

18. The method according to claim 15, further comprising:
deactivating the control signal upon deactivating the activation signal.

19. The method according to claim 15, further comprising:
applying a status reset signal upon deactivating the control signal.

* * * * *